(12) United States Patent
Greene et al.

(10) Patent No.: US 7,925,308 B2
(45) Date of Patent: Apr. 12, 2011

(54) RADIO-FREQUENCY (RF) POWER PORTAL

(75) Inventors: Charles E. Greene, Pittsburgh, PA (US); Daniel W. Harrist, Carnegie, PA (US); John G. Shearer, Ligonier, PA (US)

(73) Assignee: Powercast Corporation, Ligonier, PA (US)

( * ) Notice: Subject to any disclaimer, the term of this patent is extended or adjusted under 35 U.S.C. 154(b) by 678 days.

(21) Appl. No.: 11/601,142

(22) Filed: Nov. 17, 2006

(65) Prior Publication Data

US 2007/0117596 A1   May 24, 2007

Related U.S. Application Data

(60) Provisional application No. 60/738,523, filed on Nov. 21, 2005.

(51) Int. Cl.
*H04B 1/38* (2006.01)
*H04B 1/16* (2006.01)
(52) U.S. Cl. ............... 455/572; 455/573; 455/343.1
(58) Field of Classification Search ............ 320/104
See application file for complete search history.

(56) References Cited

U.S. PATENT DOCUMENTS

| | | | | |
|---|---|---|---|---|
| 6,127,799 A * | 10/2000 | Krishnan | ............... | 320/104 |
| 6,289,237 B1 * | 9/2001 | Mickle et al. | ............... | 600/509 |
| 6,411,212 B1 * | 6/2002 | Hecht et al. | ............... | 340/572.1 |
| 7,375,637 B2 * | 5/2008 | Mickle et al. | ............... | 340/572.1 |
| 7,400,253 B2 * | 7/2008 | Cohen | ............... | 340/572.1 |
| 7,567,824 B2 * | 7/2009 | Mickle et al. | ............... | 455/573 |
| 2001/0010491 A1 * | 8/2001 | Marneweck et al. | ...... | 340/10.33 |
| 2002/0155845 A1 | 10/2002 | Martorana | | |
| 2003/0119568 A1 * | 6/2003 | Menard | ............... | 455/572 |
| 2004/0000713 A1 * | 1/2004 | Yamashita et al. | ............ | 257/728 |
| 2004/0204240 A1 * | 10/2004 | Barney | ............... | 463/36 |
| 2005/0035849 A1 * | 2/2005 | Yizhack | ............... | 340/5.92 |
| 2005/0095498 A1 * | 5/2005 | Silverman | ............... | 429/61 |
| 2005/0194926 A1 * | 9/2005 | Di Stefano | ............... | 320/108 |
| 2005/0280508 A1 * | 12/2005 | Mravca et al. | ............... | 340/10.2 |
| 2006/0009817 A1 * | 1/2006 | Tulkki | ............... | 607/60 |
| 2006/0244594 A1 * | 11/2006 | Malone et al. | ............... | 340/572.1 |
| 2006/0255948 A1 * | 11/2006 | Runyon et al. | ............... | 340/572.7 |
| 2006/0259098 A1 * | 11/2006 | Erickson | ............... | 607/61 |
| 2007/0018832 A1 * | 1/2007 | Beigel et al. | ............... | 340/572.7 |

OTHER PUBLICATIONS

International Search Report and Written Opinion of the International Searching Authority for International Application No. PCT/US06/44818, mailed Sep. 24, 2007, 8 pages.

International Preliminary Report on Patentability for International Application No. PCT/US06/44818, mailed Oct. 3, 2008, 4 pages.

* cited by examiner

*Primary Examiner* — Matthew D Anderson
*Assistant Examiner* — Gennadiy Tsvey

(57) ABSTRACT

A system for powering a mobile device having an energy harvester which receives wireless energy and converts the energy into current includes a first portal in which wireless energy is transmitted for the energy harvester of the mobile device to receive and convert it into current when the device is in the first portal. The system comprises a second portal separate and apart from the first portal with a gap between the first portal and the second portal, the second portal in which wireless energy is transmitted for the energy harvester of the mobile device to receive and convert it into current after the device has passed through the first portal and the gap and is in the second portal. A method for powering a mobile device having an energy harvester which receives wireless energy and converts the energy into current is also disclosed.

28 Claims, 8 Drawing Sheets

RADIO-FREQUENCY (RF) POWER PORTAL

CROSS-REFERENCE TO RELATED APPLICATIONS

This application claims the benefit of U.S. Provisional Patent Application Ser. No. 60/738,523, filed Nov. 21, 2005.

BACKGROUND OF THE INVENTION

1. Field of the Invention

The present invention relates to a system for powering a mobile device having an energy harvester which receives wireless energy and converts the energy into current. More specifically, the present invention relates to a system for powering a mobile device having an energy harvester which receives wireless energy and converts the energy into current when it is in a portal in which wireless energy is transmitted for the energy harvester of the mobile device.

2. Description of Related Art

As processor capabilities have expanded and power requirements have decreased, there has been an ongoing explosion of devices that operate completely independent of wires or power cords. These "untethered" devices range from cell phones and wireless keyboards to building sensors and active Radio Frequency Identification (RFID) tags.

Engineers and designers of these untethered devices continue to have to deal with the limitations of portable power sources, primarily using batteries as the key design parameter. While the performance of processors and portable devices has been doubling every 18-24 months driven by Moore's law, battery technology in terms of capacity has only been growing at a measly 6% per year. Even with power conscious designs and the latest in battery technology, many devices do not meet the lifetime cost and maintenance requirements for applications that require a large number of untethered devices such as logistics and building automation. Today's devices that need two-way communication require scheduled maintenance every three to 18 months to replace or recharge the device's power source (typically a battery). One-way devices that simply broadcast their status without receiving any signals, such as automated utility meter readers, have a better battery life typically requiring replacement within 10 years. For both device types, scheduled power-source maintenance is costly and can be disruptive to the entire system that a device is intended to monitor and/or control. Unscheduled maintenance trips are even more costly and disruptive. On a macro level, the relatively high cost associated with the internal battery also reduces the practical, or economically viable, number of devices that can be deployed.

The ideal solution to the power problem for untethered devices is a device or system that can collect and harness sufficient energy from the environment. The harnessed energy would then either directly power an untethered device or augment a power supply. However, this ideal solution may not always be practical to implement due to low energy in the environment, and site restrictions may limit the ability to use a dedicated energy supply. The proposed invention takes these factors into account and provides a solution for both the ideal situation and also for more restrictive circumstances.

U.S. Pat. No. 6,127,799 discloses a method and apparatus for wireless powering and recharging by use of an electromagnetic field with an antenna. The antenna may be one or more dipole antennas that are combined to form at least two subsets of dipole antenna element array, wherein one subset may be oriented at an acute or a right angle with respect to at least one other subset. The technology disclosed in U.S. Pat. No. 6,127,799 is limited by the fact that the power conversion efficiency of the antenna array is dependent on the number of dipoles. Additionally, U.S. Pat. No. 6,127,799 discloses the use of dipole antennas, which may not be practical for most battery-operated devices due to the size of the antenna and antenna array. This prior disclosure, states that the dipole antennas are used to cover more than one side of a battery that has a width of 12.5 cm which makes in impractical for certain devices and battery sizes. There are also limitations on the battery that can be used with the prior disclosure due to metal pieces inside the battery, which tend to absorb RF energy. The invention disclosed herein does not suffer from the described limitations of the antenna and battery and is applicable with any antenna and battery type.

U.S. Pat. No. 5,994,871 discloses a system for charging a secondary cell using transmitted microwave energy, however, it relies solely on the use of an existing microwave oven as the charging means.

U.S. Pat. No. 5,982,139 discloses a remote charging system for a vehicle capable of transmitting electrical energy to the electrical storage device via a wireless energy beam. The referenced patent relies on the beam being able to track the vehicle or vehicles, which limits the number of devices (vehicles) by the number of beams available at a power transmitting location. The invention disclosed herein does not suffer from this limitation and is capable of transmitting power to many devices using a single beam.

U.S. Pat. Nos. 5,411,537, 5,733,313, and 5,769,877 describe systems for providing power to implantable biomedical devices by use of electromagnetic induction techniques using power transmitting and receiving coils. The devices in these patents are limited by the fact that they can only receive power in the inductive or near-field region. Additionally, the implanted devices have a dedicated transmitter with the purpose of supplying power solely to a single implanted device.

BRIEF SUMMARY OF THE INVENTION

The present invention pertains to a system for powering a mobile device having an energy harvester which receives wireless energy and converts the energy into current. The system comprises a first portal in which wireless energy is transmitted for the energy harvester of the mobile device to receive and convert it into current when the device is in the first portal. The system comprises a second portal separate and apart from the first portal with a gap between the first portal and the second portal, the second portal in which wireless energy is transmitted for the energy harvester of the mobile device to receive and convert it into current after the device has passed through the first portal and the gap and is in the second portal.

The present invention pertains to a method for powering a mobile device having an energy harvester which receives wireless energy and converts the energy into current. The method comprises the steps of moving the device into a first portal in which wireless energy is transmitted for the energy harvester of the mobile device to receive and convert it into current when the device is in the first portal. There is the step of converting the wireless energy transmitted in the first portal by the energy harvester of the mobile device into current when the device is in the first portal. There is the step of moving the device from the first portal to a second portal separate and apart from the first portal through a gap between the first portal and the second portal in which wireless energy is transmitted for the energy harvester of the mobile device to receive and convert it into current when the device is in the second portal. There is the step of converting the wireless energy transmitted in the second portal by the energy harvester of the mobile device into current when the device is in the second portal.

The present invention pertains to a method for powering a mobile device having an energy harvester which receives wireless energy and converts the energy into current. The method comprises the steps of moving the device into a portal in which wireless energy is transmitted for the energy harvester of the mobile device to receive and convert it into current when the device is in the portal. There is the step of converting the wireless energy transmitted in the portal by the energy harvester of the mobile device into current when the device is in the portal. There is the step of moving the device out of the portal. There is the step of moving the device back into the portal for the energy harvester of the mobile device to receive and convert the energy into current when the device is in the portal. There is the step of converting the wireless energy transmitted in the portal by the energy harvester of the mobile device into current when the device is back in the portal.

DETAILED DESCRIPTION OF THE INVENTION

Figure 1:
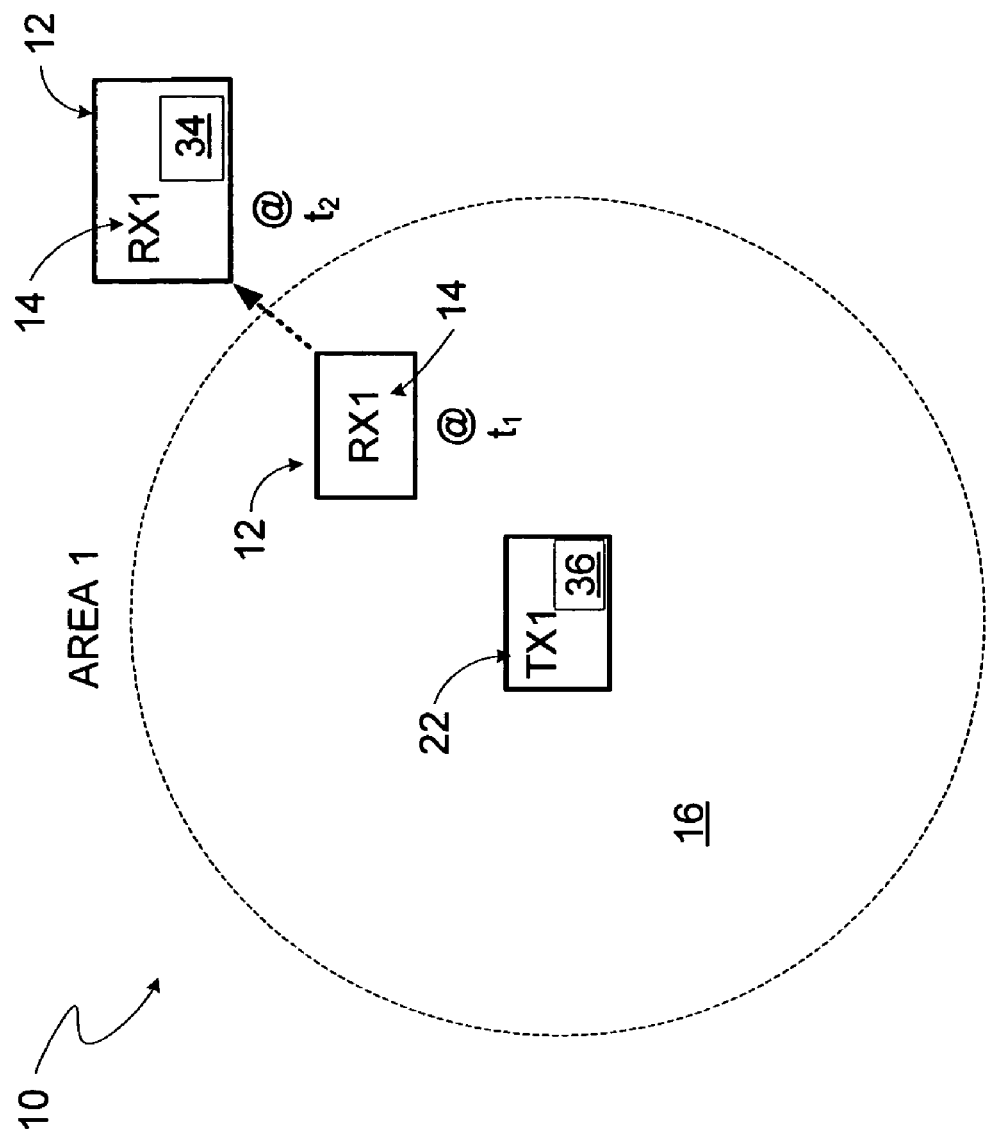
FIG. 1 shows a single RF power portal with an associated coverage area.

A complete understanding of the invention will be obtained from the following description when taken in connection with the accompanying drawing figures wherein like reference characters identify like parts throughout.

For purposes of the description hereinafter, the terms "upper", "lower", "right", "left", "vertical", "horizontal", "top", "bottom", and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

Figure 2:
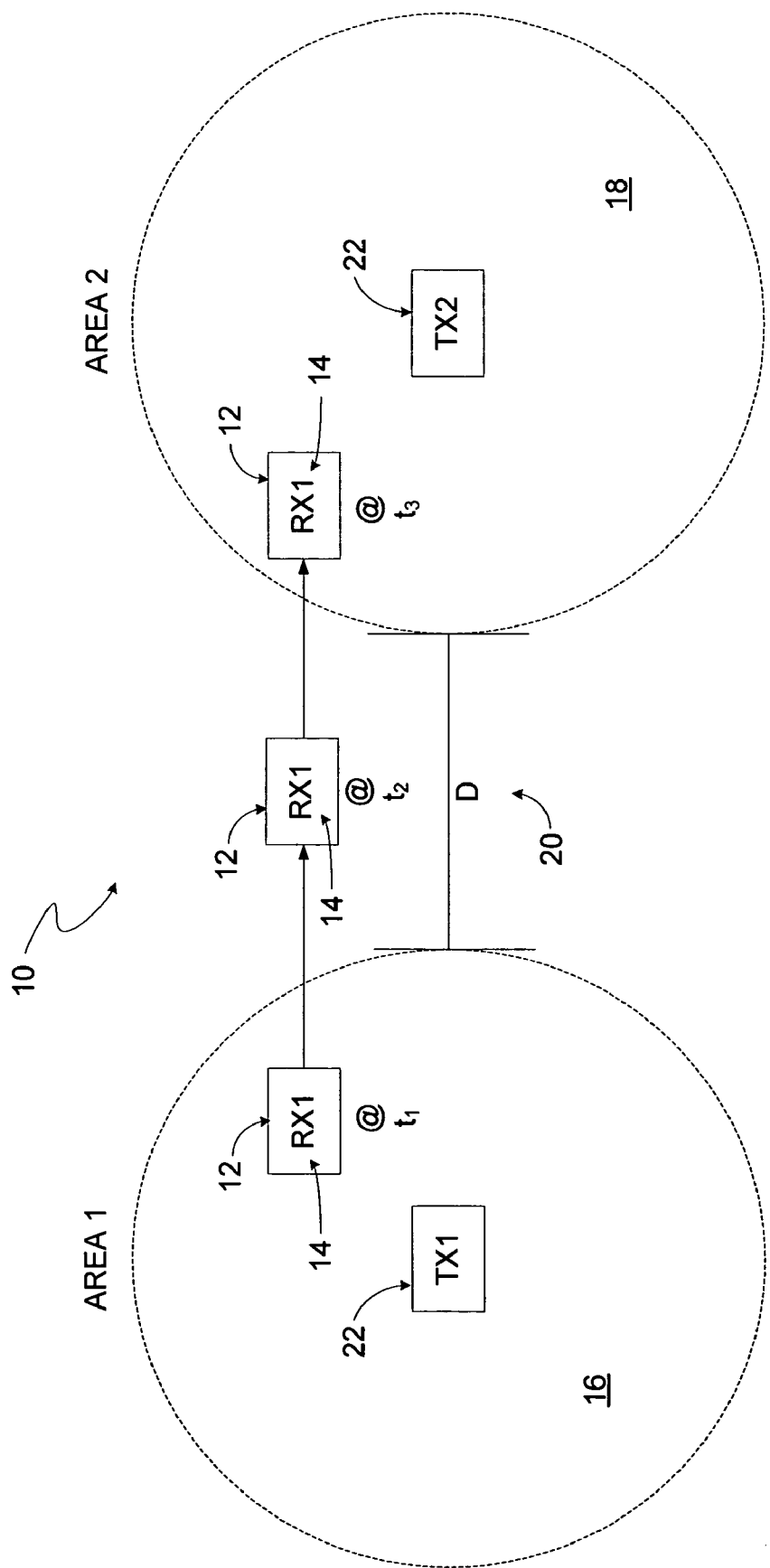
FIG. 2 shows multiple RF power portals with associated coverage areas and separated by a region without coverage.

Referring now to the drawings wherein like reference numerals refer to similar or identical parts throughout the several views, and more specifically to FIGS. 1 and 2 thereof, there is shown a system 10 for powering a mobile device 12 having an energy harvester 14 which receives wireless energy and converts the energy into current. The system 10 comprises a first portal 16 in which wireless energy is transmitted for the energy harvester 14 of the mobile device 12 to receive and convert it into current when the device 12 is in the first portal 16. The system 10 comprises a second portal 18 separate and apart from the first portal 16 with a gap 20 between the first portal 16 and the second portal 18, the second portal 18 in which wireless energy is transmitted for the energy harvester 14 of the mobile device 12 to receive and convert it into current after the device 12 has passed through the first portal 16 and the gap 20 and is in the second portal 18.

A method and apparatus for high efficiency rectification for various loads (energy harvester and energy harvesting), which are suitable for receiving the RF power distributed by the present invention, have been discussed in detail in U.S. Patent Application Publication No. 2007/0178857, which is incorporated herein by reference.

Preferably, the portal is defined by a minimum field strength. The portal preferably has at least one wireless energy transmitter 22, and could have a plurality of wireless transmitters. Preferably, the wireless energy transmitter 22 produces pulses of energy. The system 10 preferably includes a third portal 24 separate and apart from the first portal 16 and the second portal 18 with a second gap 26 between the third portal 24 and the second portal 18. The third portal 24 in which wireless energy is transmitted for the energy harvester 14 of the mobile device 12 to receive and convert it into current after the device 12 has passed through the second portal 18 and the second gap 26 and is in the third portal 24. Preferably, each portal has a wireless energy transmitter 22. The device can include a charge storage element 34 in the device in communication with the energy harvester to receive the current from the harvester to charge the storage element 34.

The present invention pertains to a method for powering a mobile device 12 having an energy harvester 14 which receives wireless energy and converts the energy into current. The method comprises the steps of moving the device 12 into a first portal 16 in which wireless energy is transmitted for the energy harvester 14 of the mobile device 12 to receive and convert it into current when the device 12 is in the first portal 16. There is the step of converting the wireless energy transmitted in the first portal 16 by the energy harvester 14 of the mobile device 12 into current when the device 12 is in the first portal 16. There is the step of moving the device 12 from the first portal 16 to a second portal 18 separate and apart from the first portal 16 through a gap 20 between the first portal 16 and the second portal 18 in which wireless energy is transmitted for the energy harvester 14 of the mobile device 12 to receive and convert it into current when the device 12 is in the second portal 18. There is the step of converting the wireless energy transmitted in the second portal 18 by the energy harvester 14 of the mobile device 12 into current when the device 12 is in the second portal 18.

There can be the step of communicating with the device 12 with a communication transceiver 36. The communication transceiver 36 can be co-located with a wireless energy transmitter 22. There can be the step of charging a charge storage element 34 in the device.

Preferably, there is the step of moving the device 12 from the second portal 18 to a third portal 24 separate and apart from the first portal 16 and the second portal 18 through a second gap 26 between the second portal 18 and the third portal 24 in which wireless energy is transmitted for the energy harvester 14 of the mobile device 12 to receive and convert it into current when the device 12 is in the third portal 24. The moving the device 12 into the first portal 16 step preferably includes the step of moving the device 12 into the first portal 16 which is at a loading dock 28.

The present invention pertains to a method for powering a mobile device 12 having an energy harvester 14 which receives wireless energy and converts the energy into current. The method comprises the steps of moving the device 12 into a portal in which wireless energy is transmitted for the energy harvester 14 of the mobile device 12 to receive and convert it into current when the device 12 is in the portal. There is the step of converting the wireless energy transmitted in the portal by the energy harvester 14 of the mobile device 12 into current when the device 12 is in the portal. There is the step of moving the device 12 out of the portal. There is the step of moving the device 12 back into the portal for the energy harvester 14 of the mobile device 12 to receive and convert the energy into current when the device 12 is in the portal. There is the step of converting the wireless energy transmitted in the portal by the energy harvester 14 of the mobile device 12 into current when the device 12 is back in the portal.

Preferably, the portal is defined by a minimum field strength. The portal preferably has a wireless energy transmitter 22. There can be the step of communicating with the device 12 with a communication transceiver 36. The communication transceiver 36 can be co-located with the energy transmitter 22.

Preferably, the wireless energy transmitter 22 produces pulses of energy. The moving the device 12 into the portal step preferably includes the step of moving the device 12 into the portal which is at a loading dock 28. Alternatively, the device 12 can be an RFID tag, and there can be the step of communicating data from the RFID tag to a data receiver 38.

The moving the device 12 into the portal step includes the step of moving the device 12 into the portal which is at a recharging cabinet. There can be the step of eliminating interference with other equipment and protecting humans from the energy with shielding in the recharging cabinet.

Untethered devices 12 can be classified into two categories, stationary and mobile. A stationary device 12 is defined as, but not limited to, a device 12 that is designed not to move. A mobile device 12 is defined as, but not limited to, a device 12 that is designed with the ability to move or be moved. Mobile devices pose a problem when trying to implement a powering solution due to the constant change in the device 12 location. One solution for mobile devices was proposed in U.S. Patent Application Publication No. 2006/0270440, entitled "Power Transmission Network," which is incorporated by reference herein. The application describes how a Radio Frequency (RF) power-harvesting network could be setup to provide power to devices within a specific area. However, mobile devices may not always be confined to the coverage area. In this situation, once the device 12 leaves the area, it will no longer receive power, making the device 12 rely solely on its power supply, if one exists. The proposed invention addresses this issue by creating an RF power portal. The purpose of the power portal is to provide a device 12 with enough operating power so the device 12 can function while it is outside the coverage area until it needs to return to a power portal to obtain additional power. This method is analogous to recharging a cell phone. Once the battery charger has charged the battery, the cell phone can be removed from the charger. The cell phone is then free to move away from the charger and operate until it uses the charge stored in the battery. At this point, the cell phone must return to the battery charger to obtain more power. In this example, the RF power portal is analogous to the cell phone battery charger.

In the previous example, the cell phone must be directly connected (wired) to the charger in order for charge to be transferred. The proposed invention eliminates the need for a wired connection in order to transfer charge. The charge is transferred to the device 12 from the RF power portal preferably in the form of electromagnetic waves or RF energy. The device 12 contains an energy harvester 14, which preferably is used to convert the electromagnetic waves captured by the antenna into usable current such as Direct Current (DC). This invention should not be confused with power transfer by inductive coupling, which requires the device 12 to be relatively close to the power transmission source. The RFID Handbook by the author Klaus Finkenzeller defines the inductive coupling region as distance between the transmitter and receiver of less than 0.16 times lambda where lambda is the wavelength of the RF wave. The proposed invention can obtain power in the near-field (sometimes referred to as inductive) region as well as the far-field region. The far-field region is distances greater than 0.16 times lambda. This means the RF power portal can cover a large area, such as entire room, or be localized to a portion of a room, such as around an office desk. One method of transmitting RF energy was described in U.S. Patent Application Publication No. 2006/0199620, entitled "Method, Apparatus and System for Power Transmission," which is incorporated by reference herein, which describes the use of RF energy pulses to increase the efficiency of the energy harvester 14 in the receiving device 12. The pulsing method can also be used with the invention proposed herein to provide a larger coverage area than those available for Continuous Wave (CW) implementations. The coverage area can be defined by an instantaneous, peak, or average field strength or power density with respect the power transmitter. As an example, the energy harvester 14 may require an electric field strength of one volt per meter in order to convert the electromagnetic energy to DC at an acceptable efficiency. For a CW power transmitter, this field strength may correspond to a distance from the power transmitter of six feet. However, the device 12 may be located at ten feet meaning it is outside the CW coverage area. If pulsing is used, a larger amount of power can be transmitter at a particular duty cycle in order to average to the same amount of power as the CW case, however, the peak electric field will be greater than the CW case at six feet although the average is the same. The electric field strength at ten feet will then have a peak value greater than one volt per meter, which will enable the energy harvester 14 to capture and convert energy.

The RF power portal can be configured in numerous ways. Several of these configurations are presented and should not be considered limiting but rather examples of the invention. The first embodiment of the RF power portal is a single transmitter having a single coverage area, AREA 1. A coverage area (or volume) is defined by a minimum electric, magnetic, and/or electromagnetic field strength and is represented as a dashed line in all figures. It should be noted that the figures illustrate a circular coverage area, however, the shape of the coverage area may take on other shapes for different antenna types and environments. As an example, Area 1 in FIG. 1 may be defined as the area in which the electric field strength generated by Transmitter 1 (TX1) is greater than two volts per meter (2 V/m). It should be noted that TX1 in FIG. 1 preferably contains an RF transmitter and an antenna. Subsequent figures may use the same transmitter block or may separate the transmitter and antenna. The transmitter will be represented in the figures by a TX block with or without a trailing number such as TX, TX1, TX2, etc.

For the configuration in FIG. 1, the device 12, RX1, is receiving operational and recharging power from the RF field produced by the RF power transmitter, TX1, while it is in the coverage area, AREA1. The device 12, RX1, at time t1 in FIG. 1, is receiving not only operational power but also additional charge that may be stored in a charge storage element such as, but not limited to, a battery and/or capacitor, or other charge storage element, for use if the device 12 leaves the coverage area, AREA1. As an example, at time t2 in FIG. 1, the device 12 is operating from power captured while in the coverage area. When the charge captured at time t1 has been depleted the device 12 is operating from charge stored previously in the charge storage element. As can be seen by examining FIG. 1, the device 12 can continuously operate if the device 12 periodically returns to the coverage area to obtain additional charge. As an example, the device 12 may require 1 joule of energy to operate for a twenty-four hour period. If the device 12 then returns to the coverage area after the twenty-four hour period, it may be able to capture an amount of power equivalent to that used in the twenty-four hour period, 1 joule, by remaining in the coverage area for one hour. In this example, the device 12 can capture all charge needed for operation from the RF power transmitter, TX1. There may, however, be applications where the device 12 is away from the coverage area for longer periods of time than twenty-four hours, which can be combated by increasing the time the device 12 must remain in the coverage area. There may also be cases where the lifetime of the device 12 is a known finite value and therefore, the device 12 may not need to capture the total amount of charge used in the time away from the coverage area. Rather, the device 12 needs to capture an amount less than the charge used but enough to insure operation for the lifetime of the device's battery or other storage element. There may also be instances where the device 12 may leave the coverage area for an unknown extended period of time. In which case, the RF power transmitter must fully charge the device 12 to the peak capacity of the charge storage element to insure the device 12 can function until it is able to return to the RF power portal.

Another embodiment of the RF power portal is shown in FIG. 2. FIG. 2 shows multiple coverage areas separated by a distance, D. In this case, the device 12 may obtain power in the first coverage area, AREA1, at time t1 from the RF power transmitter, TX1, for the purpose of having enough power to travel the distance, D, to the second coverage area, AREA2, where at time t3 the device 12 would be able to capture charge from RF power transmitter, TX2, to replace the charge used during time t2 outside the coverage areas, AREA1 and AREA2. As an example, the device 12 may take twenty-four hours to travel the distance, D, between the first coverage area and the second coverage area and may use 10 joules of energy while outside the coverage areas. The first RF power transmitter, TX1, must therefore supply the device 12 with 10 joules of energy in order to travel the distance, D, between the two coverage areas. Once the device 12 reaches the second coverage area, AREA2, it can capture an amount of power equivalent to that used in the twenty-four hour period, 10 joules, by remaining in the coverage area for a given period of time.

Figure 3:
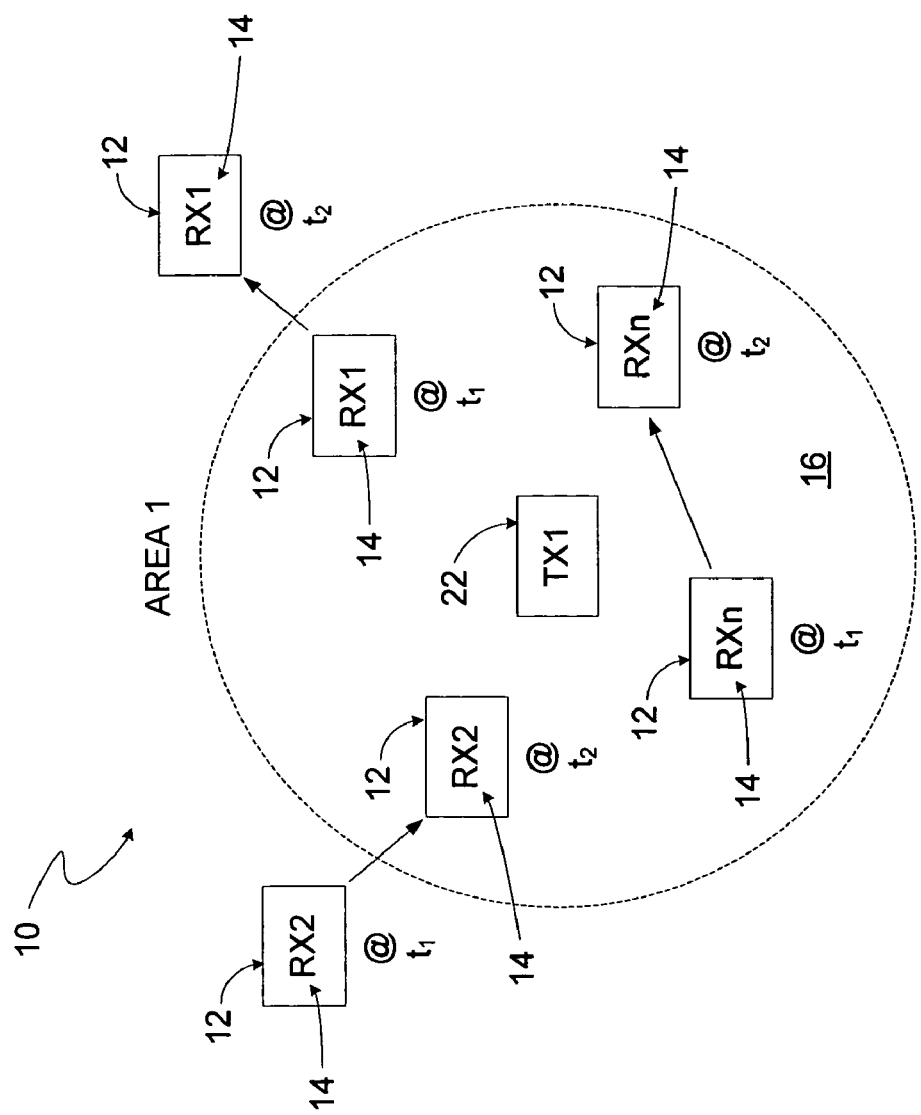
FIG. 3 shows a single RF power portal with an associated coverage area with multiple devices.
Figure 4:
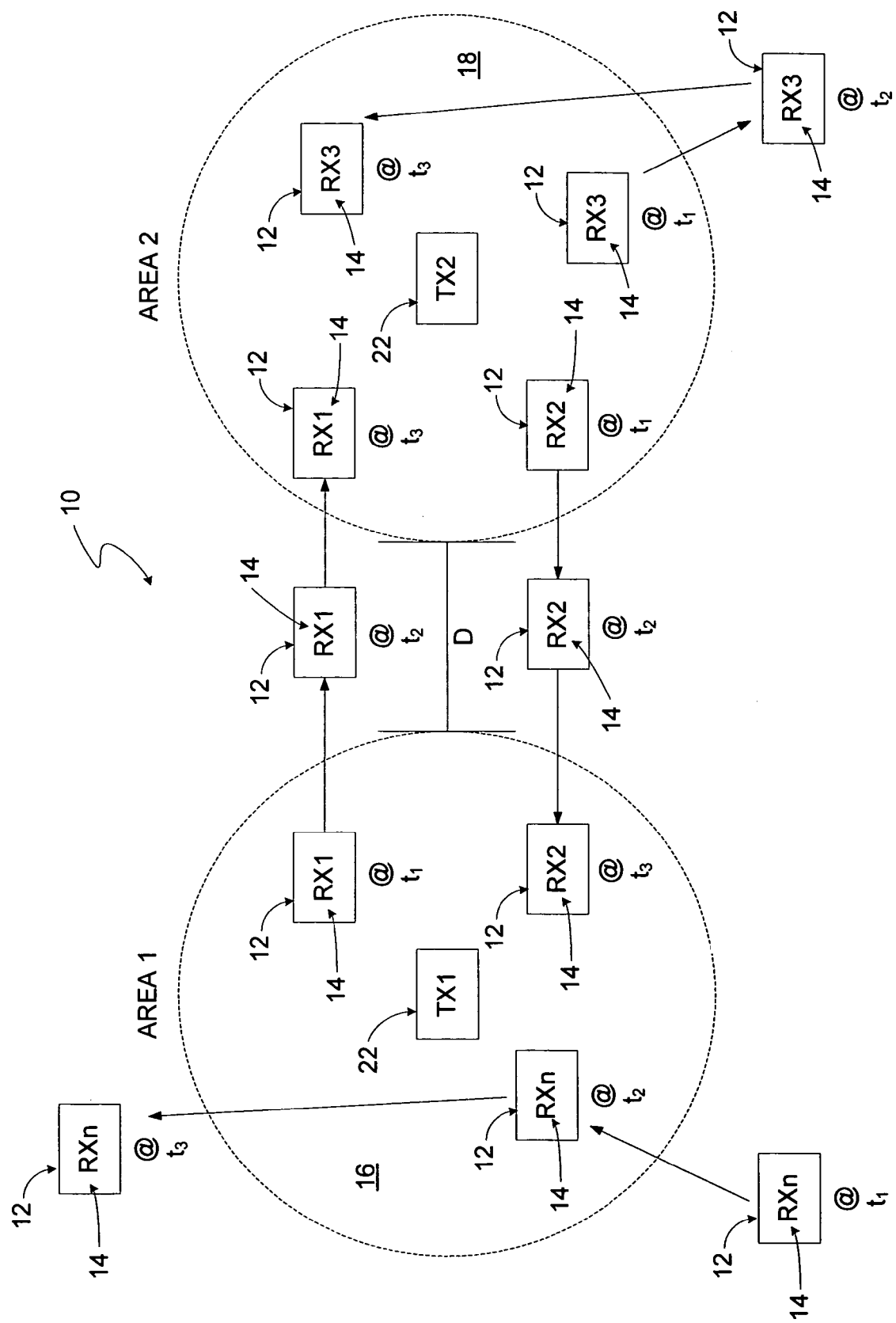
FIG. 4 shows multiple RF power portals with associated coverage areas with multiple devices and separated by a region without coverage.

It should be noted that the inventions in FIG. 1 and FIG. 2 may be used with more than one device 12 which is shown in FIG. 3 and FIG. 4, respectively.

Figure 5:
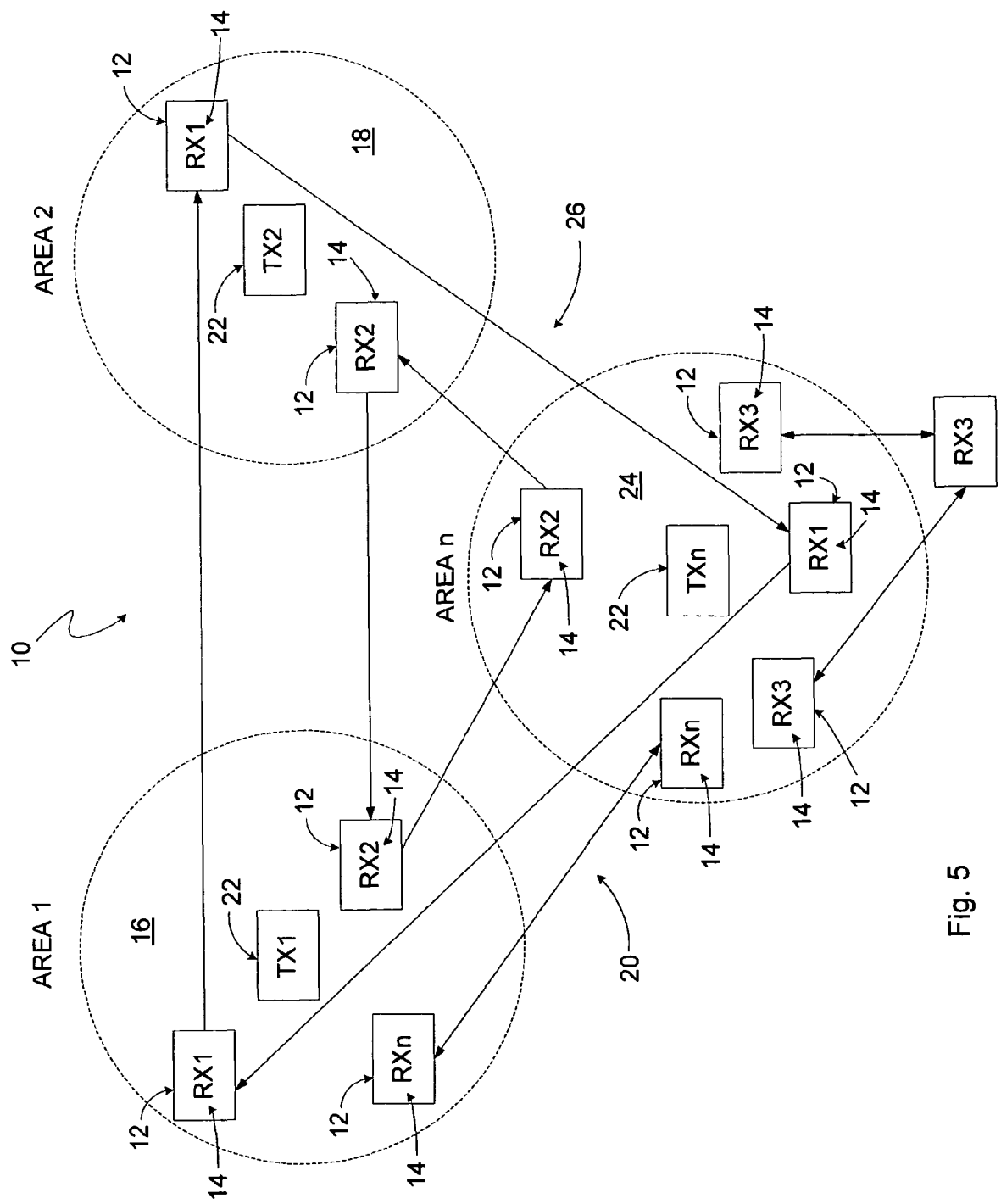
FIG. 5 shows multiple RF power portals with associated coverage areas with multiple devices and each separated by regions without coverage.

It should be noted that the invention may be extended to include multiple RF power transmitters each with an associated coverage area with each area having any number of devices which can move in and out of the coverage areas provided by the RF power transmitters. An expanded version of the invention is shown in FIG. 5.

If found to be advantageous, the device 12 may communicate with a communication transceiver 36 located inside or outside the coverage area(s) while the device 12 is inside or outside the coverage area(s). A communication transceiver 36 is defined as a transmitter and/or receiver using wireless communication techniques to transfer data. A practical implementation of the invention with a communication transceiver 36 would be to have the RF power transmitter collocated with the communication transceiver 36 and have the device 12 communicate while it is inside the coverage area. Communication inside the coverage area allows the device 12 to use additional power to transmit/receive data because the RF power transmitter is supplying the device 12 with additional power to recharge its storage element, which could then be used to supply the additional power to turn on the communication transceiver 36. The device 12 may transmit multiple data readings collected while it was outside the range of the communication transceiver 36.

Specifically, the RF power portal is a defined area (or volume) where a device 12 can receive and store operational power for current and later use inside or outside of the coverage area. More specifically, the RF power portal may contain at least one RF power transmitter with at least one associated antenna that defines a coverage area where mobile devices with energy harvesters 14 may be located. The portal is designed so the device 12 will be able to capture enough power from the transmitter for operation during its time away from the RF power portal. To give further insight into the described invention, several examples of implementation will be given. The portal can have a plurality of wireless energy transmitters, all of which are the same, or some of which are different in regard to the amplitude of the energy they output and/or the polarization, frequency or pulse of the output.

One implementation of an RF power portal is a battery recharging cabinet. The cabinet may be a new or existing structure where one or more RF transmitters are located in order to provide power to one or more devices. The cabinet or structure may or may not be shielded to minimize RF interference depending on its environment. A specific example of the battery recharging cabinet was designed for a hospital environment. The cabinet was shielded to eliminate interference with hospital equipment and was designed to recharge the battery or batteries in a patient-tracking device 12. The shielding also allows the power to be elevated without risk of exposing humans to unsafe levels of RF energy as regulated by the Federal Communications Commission (FCC) and other standards bodies. The recharging cabinet was designed to eliminate the need for a hardwired recharging device 12 and to allow the nurse or other staff member to simply place the tracking device 12 inside the cabinet in any direction rather than in a recharging cradle. After a predetermined charging period, the device 12 can be removed from the cabinet for use in the hospital. The door of the cabinet was connected to a switch to control the operation of the transmitter, but this does not have to be the case. When the door is open, the transmitter power was turned off to eliminate any interference with hospital equipment. The power could also be turned down instead of off. The device 12 was required to operate for several days before recharging was required. The output power of the transmitter inside the cabinet was designed to provide the battery with enough charge to supply the required power to the device 12 for the average stay of a patient. The average patient stay was chosen because the device 12 can operate longer if needed. As an example, the average patient stay may be two days meaning the battery recharging cabinet will supply the battery with two days of charge. The patient, however, may stay in the hospital for five days. This does not mean the device 12 will fail to operate after the second day. After the second day, the device 12 will run off of the reserve charge stored in the battery, and the battery will begin to drain below a reference level. When the device 12 is returned to the cabinet after the fifth day, it will receive enough charge to operate for an additional two days. However, the next patient may only have a stay of one day. As can be seen by using the average, the power stored in the battery will average to the reference level allowing the device 12 to operate without problems.

It may also be advantageous to implement the system 10 described above in an existing structure within the hospital. One existing structure that was explored was the sterilization equipment. The patient-tracking device 12 needs to be sterilized after each use. The sterilization may be performed in an autoclave, by ethylene oxide, or by another sterilization system. In any case, the sterilization system 10 is a predefined location where devices are placed for a specific reason. The proposed idea was to use the sterilization system 10 to sterilize and recharge the patient-tracking devices. The method eliminated the step of placing the devices in the cabinet after sterilization. Rather, the devices could be recharged while they were being sterilized.

Figure 6:
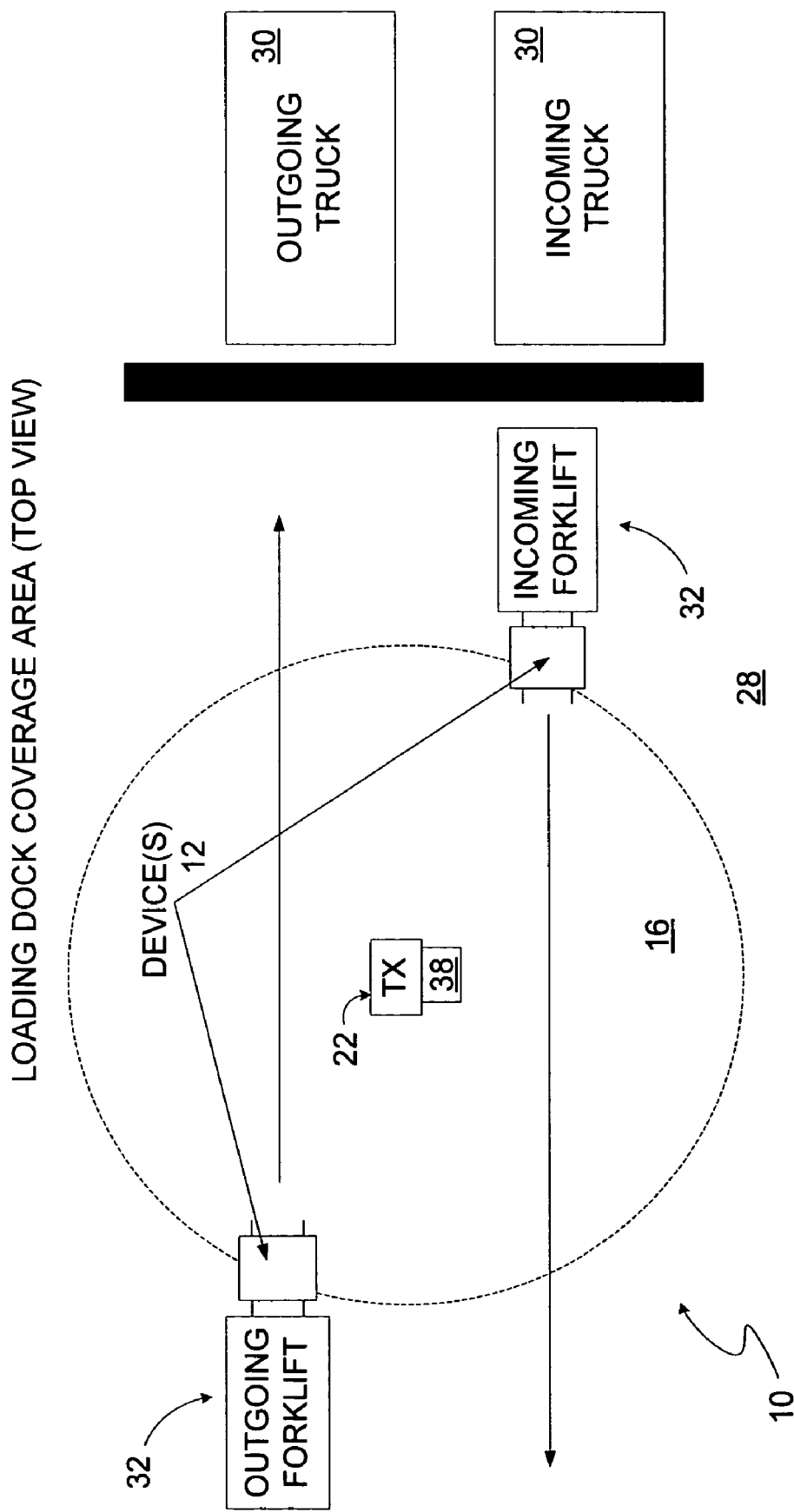
FIG. 6 shows an RF power portal implemented at a loading dock.

Another implementation of the RF power portal can be constructed in a loading dock 28. The RF power portal can be used to provide charge to devices as they are exiting or entering the dock to or from delivery trucks 30. In this case, interference with other equipment may not be a problem, so the RF power portal may not need shielding meaning the RF power portal could be open to allow devices 12 to pass through and not impede normal loading dock 28 functions. It should be noted that the invention has the ability of being transparent to the user by allowing mobile devices 12 to remain mobile rather than requiring them to be stationary for a given period of time in order to be recharged. As an example, the device 12 may be attached to a pallet that is being moved by a forklift 32. The forklift 32 could simply drive through the RF power portal, which would then supply the device 12 with the required power as shown in FIG. 6. The device 12 may be but is not limited to an active RFID tag. An active RFID tag is defined as a device 12 with power storage, which uses backscatter, transformer impedance reflection, or a standard antenna to antenna link to communicate with a data receiver 38. The active RFID tag may be used to measure temperature of a product or may be connected to a cargo container to monitor the contents and other environmental factors such as tampering.

Figure 7:
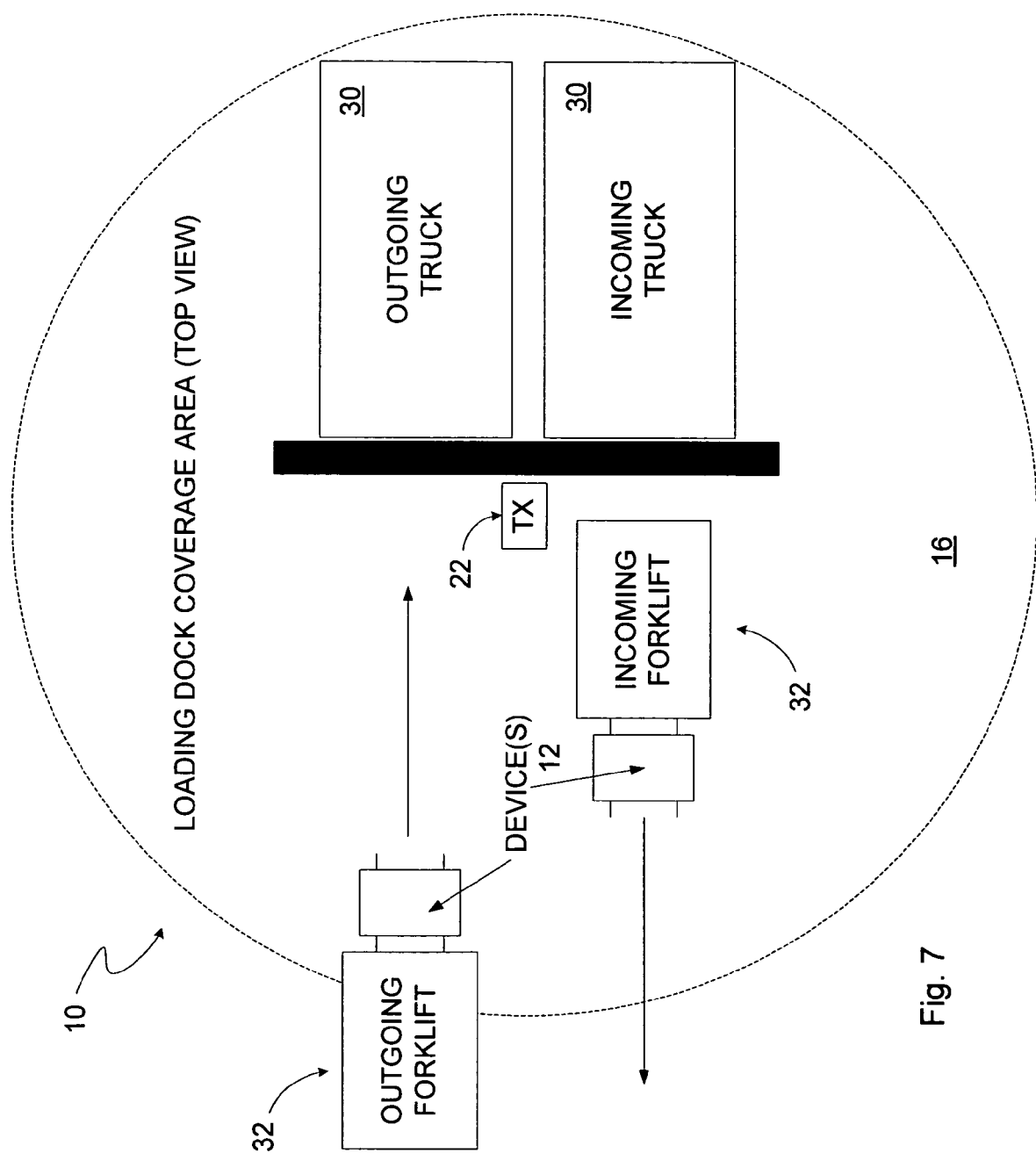
FIG. 7 shows an expanded RF power portal implemented in a loading dock.

To better illustrate the operation of the RF power portal, consider a typical temperature sensor, which requires one joule of energy to transmit the temperature at a sampling rate of once per hour. If the device 12 will be away from an RF power portal for 12 hours, the device 12 will need to obtain 0.5 joules from the RF power portal for the 12-hour trip. If it is assumed that the device 12 is in the portal area for 60 seconds, the amount of power that must be provided by the portal is 0.5 joules divided by 60 seconds or 8.3 milli-joules per second or 8.3 milli-watts of continuous power. It may not be advantageous for the device 12 to be in the portal area for 60 seconds and therefore the portal area may be expanded to include the trucks 30, which will be in the portal area for a time far greater than 60 seconds for loading purposes. The expansion of the RF power portal allows the devices 12 to charge not only in the loading dock 28 area but also inside the trucks 30. The expanded RF power portal can be seen in FIG. 7.

Figure 8:
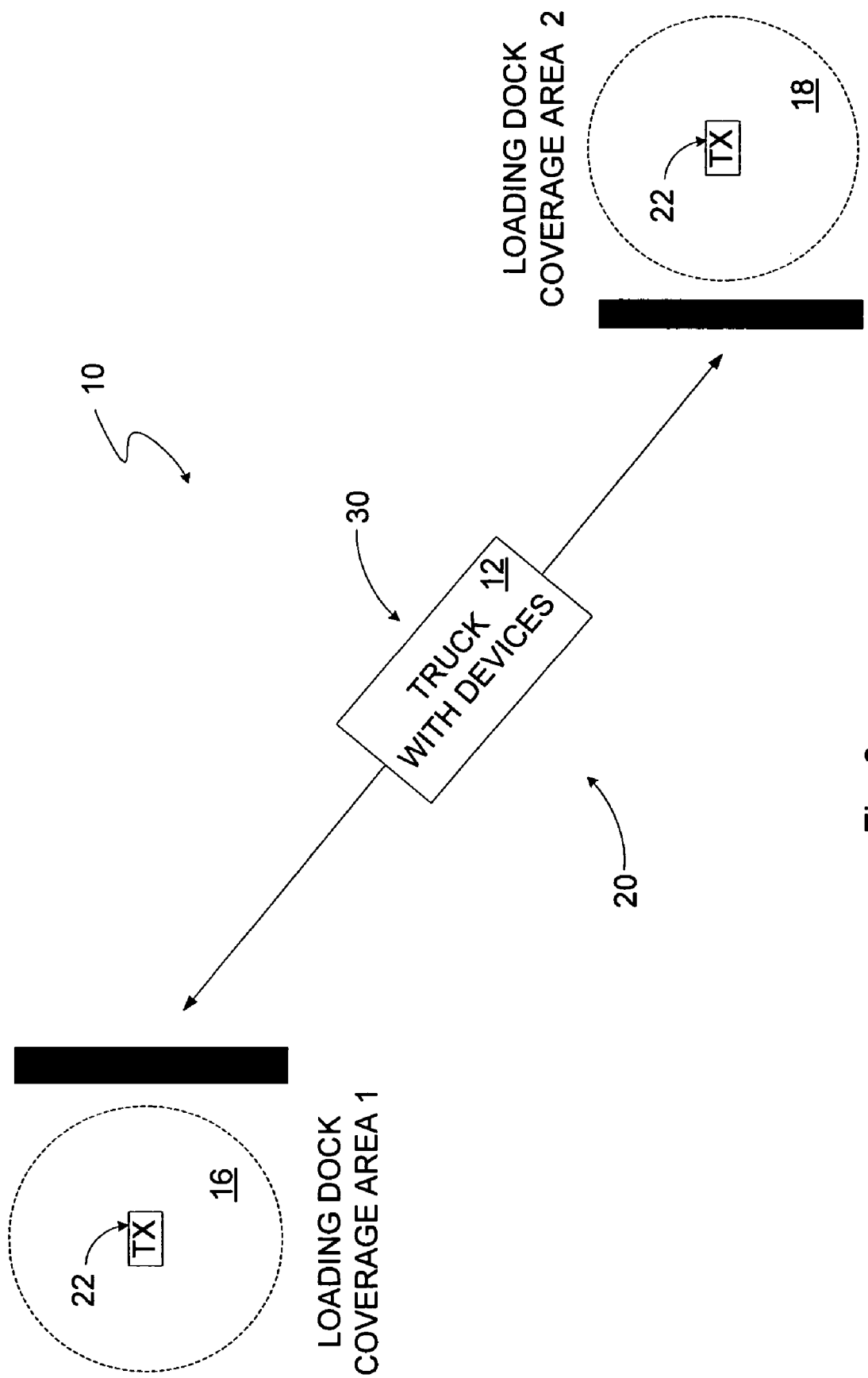
FIG. 8 shows the implementation of a multiple load dock example.

In a similar example shown in FIG. 8, an active RFID tag or other sensing device 12 could obtain enough charge at a first loading dock 28 to ensure its operation for the duration of the travel to a second loading dock 28 where it would again receive power. In this application, charging the device 12 at discrete locations ensures that the device 12 can function without wired battery recharging or battery replacement throughout the lifetime or duration of the device 12. It should be noted that the device 12 may have a power storage device 12 other than a battery such as, but not limited to, a capacitor.

The concept of an RF power portal can be expanded without limit to include greater than two areas. The increased number of RF power portals will decrease the demands on each individual RF power portal by decreasing the distance between portals thereby decreasing the amount of power that each area must supply to the device 12 for its travel between RF power portals.

For another example, a plurality of RF power portals may be located in different environments, for example, at a desk, in a car, at home on a kitchen counter, and/or at a coffee shop. A cell phone containing a device 12 may receive power from each or any of the RF power portals as the cell phone is within each power portal's coverage area. For example, a user may have the cell phone at work. The cell phone receives power from the power portal at the desk when in the coverage area for the transmitter of the desk power portal. When the user then enters his car, the cell phone would receive power from the power portal in the car. When the user places his cell phone on the kitchen counter, the cell phone would receive power from the power portal on the kitchen counter. When the user goes to the coffee shop, the cell phone would receive power from the power portal at the coffee shop. The cell phone would collect power from each power portal which would provide power to the cell phone during travel between the power portals.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

The invention claimed is:

1. A method for powering a mobile device having an energy harvester, the method comprising:
   converting, during a first time period, the wireless energy by the energy harvester of the mobile device into current when the mobile device is in the portal, wireless energy being transmitted in the portal to the energy harvester of the mobile device to receive and convert into current when the mobile device is in the portal, the mobile device being in the portal during the first time period;
   charging a charge storage element of the mobile device when the mobile device is in the portal during the first time period using at least a portion of the current;
   enabling a communication transceiver at the mobile device in response to the charging and during the first time period, the communication transceiver operatively coupled to the energy harvester; and
   disabling the communication transceiver during a second time period, the second time period being after the first time period, the mobile device being out of the portal during the second time period, at least a portion of the mobile device being operable using current from the charged charge storage element during the second time period, the disabling being in response to the mobile device moving out of the portal.

2. A method as described in claim 1, wherein the portal defines a minimum field strength.

3. A method as described in claim 1, wherein the portal includes a wireless energy transmitter.

4. A method as described in claim 3, wherein the wireless energy transmitter produces pulses of energy.

5. A method as described in claim 1, further comprising communicating with the mobile device via a communication transceiver of the portal.

6. A method as described in claim 5, wherein the communication transceiver of the portal is co-located with a wireless energy transmitter of the portal.

7. A method as described in claim 1, wherein the portal includes a plurality of wireless energy transmitters separate from the communication transceiver, the plurality of wireless energy transmitters transmitting the wireless energy.

8. A method as described in claim 1, wherein:
the portal includes a first wireless energy transmitter and a second wireless energy transmitter,
the first wireless energy transmitter operating at a first frequency,
the second wireless energy transmitter operating at a second frequency different from the first frequency.

9. A method as described in claim 1, wherein:
the portal includes a first wireless energy transmitter and a second wireless energy transmitter,
the first wireless energy transmitter operating at a first polarization,
the second wireless energy transmitter operating at a second polarization different from the first polarization.

10. A method as described in claim 1, further comprising:
collecting, during the second time period and at the mobile device, a plurality of data readings when the communication transceiver at the mobile device is disabled.

11. A method as described in claim 1, further comprising:
transmitting a plurality of data readings from the communication transceiver at the mobile device to a communication transceiver of the portal when the communication transceiver at the mobile device is enabled, the plurality of data readings collected when the communication transceiver at the mobile device was disabled.

12. A method as described in claim 1, further comprising:
converting the wireless energy transmitted in the portal by the energy harvester of the mobile device into current during a third time period, the third time period being after the second time period, the mobile device being in the portal during the third time period; and
enabling the communication transceiver in response to the converting during the third time period.

13. A method as described in claim 1, wherein the mobile device is powered by the charge from the charge storage element of the mobile device during the second time period such that at least a portion of the mobile device is operable during the second time period when the communication transceiver is disabled.

14. A method as described in claim 1, wherein at least a portion of the current is used by the mobile device as operational power when the mobile device is in the portal during the first time period, the current associated with the operational power being different from the current used to charge the charge storage element of the mobile device when the mobile device is in the portal during the first time period.

15. A method as described in claim 1, wherein the wireless energy transmitter produces pulses of energy independent of data.

16. A method, comprising:
receiving, at an energy harvester of a mobile device, wireless energy transmitted within a first portal when the mobile device is moved into the first portal, the energy harvester of the mobile device configured to convert the wireless energy received in the first portal into direct current when the mobile device is in the first portal;
converting, at the energy harvester of the mobile device, the wireless energy transmitted in the first portal into direct current when the mobile device is in the first portal, a first portion of the direct current being used by the mobile device as operational power when the mobile device is in the first portal;
storing a second portion of the direct current within a charge storage element of the mobile device when the mobile device is in the first portal;
enabling a communication transceiver at the mobile device when the mobile device is in the first portal in response to the storing, the communication transceiver operatively coupled to the energy harvester;
receiving, at the energy harvester of the mobile device, wireless energy transmitted within a second portal after the mobile device is moved from the first portal to the second portal, the second portal being separate and apart from the first portal such that the mobile device is moved through a gap between the first portal and the second portal, at least a portion of the mobile device being operable using direct current stored within the charge storage element of the mobile device when the mobile device is in the gap between the first portal and the second portal, the energy harvester of the mobile device configured to convert the wireless energy received in the second portal into direct current when the mobile device is in the second portal;
disabling the communication transceiver when the mobile device is in the gap between the first portal and the second portal, the disabling being in response to the mobile device moving out of the first portal and into the gap between the first portal and the second portal; and
converting, at the energy harvester of the mobile device, the wireless energy transmitted in the second portal into direct current when the mobile device is in the second portal.

17. A method as described in claim 16, further comprising:
receiving, at the energy harvester of the mobile device, wireless energy transmitted within a third portal after the mobile device is moved from the second portal to the third portal, the third portal being separate and apart from the first portal and the second portal such that the mobile device is moved through a second gap between the second portal and the third portal, the energy harvester of the mobile device configured to convert the wireless energy received in the third portal into direct current when the mobile device is in the third portal.

18. A method as described in claim 16, further comprising:
receiving, at the mobile device, a communication signal from a communication transceiver of the first portal.

19. A method as described in claim 18, wherein the communication transceiver of the first portal is co-located with a wireless energy transmitter.

20. A method as described in claim 16, wherein the first portal includes a plurality of wireless energy transmitters.

21. A method as described in claim 16, further comprising:
charging the charge storage element in the mobile device when the mobile device is in the second portal.

22. A method as described in claim 16, wherein:
the first portal includes a first wireless energy transmitter and a second wireless energy transmitter,
the first wireless energy transmitter operating at a first frequency, the second wireless energy transmitter operating at a second frequency different from the first frequency.

23. A method as described in claim 16, wherein:
the first portal includes a first wireless energy transmitter and a second wireless energy transmitter,
the first wireless energy transmitter operating at a first polarization,
the second wireless energy transmitter operating at a second polarization different from the first polarization.

24. A method as described in claim 16, further comprising:
transmitting data from the mobile device when the mobile device is in the first portal and after the communication transceiver is enabled, the data collected when the mobile device is out of the first portal.

25. A method as described in claim 16, further comprising:
transmitting data from the mobile device when the mobile device is in the first portal and after the communication transceiver is enabled, the data collected when the mobile device is out of the first portal and out of the second portal; and
transmitting data from the mobile device when the mobile device is in the second portal, the data collected when the mobile device is out of the first portal and out of the second portal.

26. A method as described in claim 16, further comprising:
transmitting data from the mobile device when the mobile device is in the first portal and after the communication transceiver is enabled, the data collected when the mobile device is out of the first portal and out of the second portal; and
disabling transmission of data from the mobile device when the mobile device is in the gap.

27. A method as described in claim 16, further comprising:
collecting data at the mobile device when the mobile device is in the gap between the first portal and the second portal, the mobile device being operable to collect data when the mobile device is in the gap between the first portal and the second portal using the direct current stored within the charge storage element of the mobile device.

28. A method as described in claim 16, wherein at least a portion of the current converted at the energy harvester of the mobile device when the mobile device is in the first portal is used by the mobile device as operational power when the mobile device is in the first portal, the direct current associate with the operational power being different from the direct current stored within the charge storage element of the mobile device when the mobile device is in the first portal.

* * * * *